J. B. TAYLOR, Jr.
AIR CUSHION FOR AUTOMOBILES.
APPLICATION FILED JUNE 18, 1908.
914,896.
Patented Mar. 9, 1909.
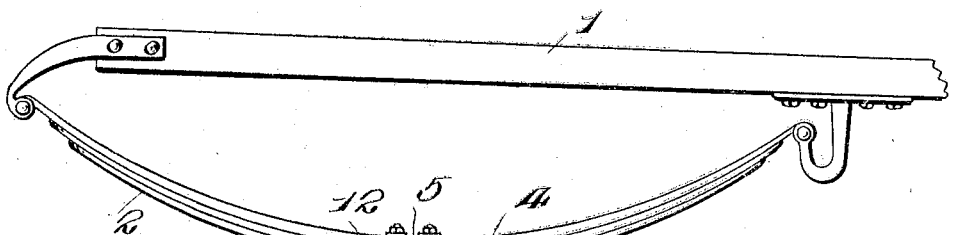
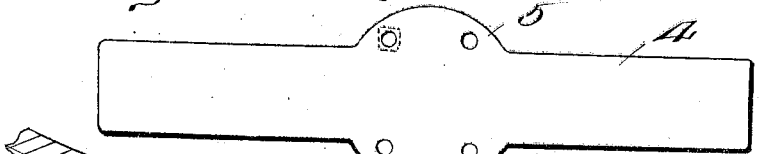
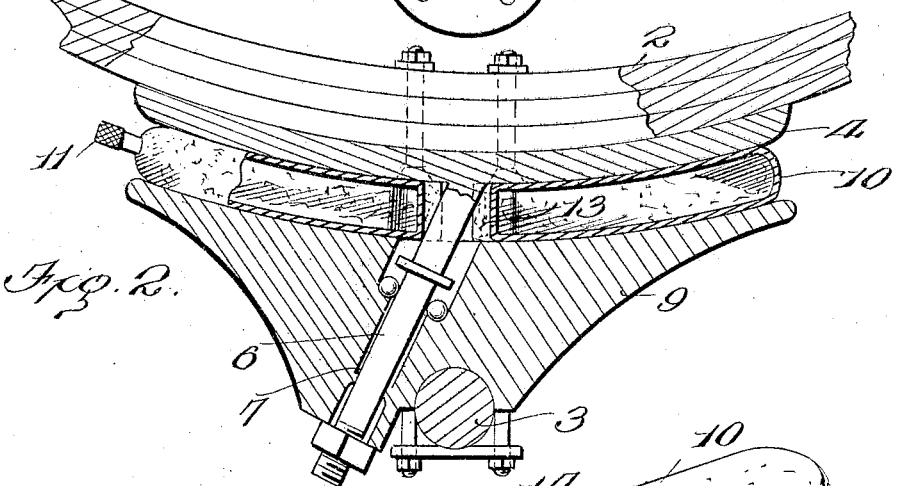
Witnesses
Inventor
J. B. Taylor, Jr.
By
Attorneys

UNITED STATES PATENT OFFICE.

JOEL B. TAYLOR, JR., OF EAST LIVERPOOL, OHIO.

AIR-CUSHION FOR AUTOMOBILES.

No. 914,896.  Specification of Letters Patent.  Patented March 9, 1909.

Application filed June 18, 1908. Serial No. 439,201.

*To all whom it may concern:*

Be it known that I, JOEL B. TAYLOR, Jr., citizen of the United States, residing at East Liverpool, in the county of Columbiana and State of Ohio, have invented certain new and useful Improvements in Air-Cushions for Automobiles, of which the following is a specification.

This invention comprehends certain new and useful improvements in running gear for automobiles or similar vehicles, and the invention has for its object, a simple, durable and efficient construction of air cushion and relative parts designed to be interposed between the body supporting springs and the axle so as to provide the necessary resiliency without the necessity of using spring wheels or pneumatic cushion tires.

With this and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings in which:

Figure 1 is view in elevation showing my device applied to a vehicle; Fig. 2 is a longitudinal section thereof on an enlarged scale; Fig. 3 is a detail view in perspective of the pneumatic cushion; and Fig. 4 is a top plan view of the plate.

Corresponding and like parts are referred to in the following description and indicated in all the views of the accompanying drawings by the same reference characters.

Referring to the drawings, the numeral 1 designates a portion of the body of the vehicle such as an automobile, 2 the ordinary arched or bow springs designed to assist in supporting the body, and 3 the axle.

4 designates a plate which is longitudinally curved as shown so as to fit against the lower side of the springs 2, said plate being formed intermediate of its ends with an enlarged portion or head 5 designed to be secured to the springs by bolts extending therethrough and attached to the springs in any desired way. The plate 4 is formed with a downwardly and rearwardly extending spindle or stem 6 which fits within an opening 7 formed for it in the enlarged portion or head 8 that is formed for it on the base member 9 of my device, said base member being supported on the axle 3 and secured thereto by any desired means. The spindle or stem 6 serves to hold the parts together in proper relative position, the nut on the threaded lower extremity of the stem serving to limit the upper movement of the spring plate 4 relative to the base member 9 and axle 3. Preferably the opening 7 is fitted with ball bearings so as to reduce the friction consequent upon any up and down movement of the stem in the operation of the device.

Interposed between the plate 4 and the base member 9 is a pneumatic cushion 10 which is longitudinally elongated as shown and which is provided at one end with an inflation valve 11. The cushion 10 is formed intermediate of its ends with a laterally enlarged portion 12 designed to fit between the heads 5 and 8, and in addition to such enlarged portion, the cushion 10 is formed with an opening 13 to accommodate the stem 7 of the plate 4. The cushion is further formed with a slot 14 opening from its outer side into the opening 13 so that the cushion may the more readily be slipped into place or removed.

From the foregoing description and accompanying drawings, it will be seen that I have provided a very simple, durable and efficient construction of air cushion for vehicles in which the resiliency is produced above the axle and the necessity of pneumatic cushion tires and spring wheels is obviated.

Having thus described the invention what is claimed as new is:

1. The combination with the body portion, springs, and axle of a vehicle, of a plate secured to the lower side of said springs and formed with a downwardly extending stem, a base member secured to the axle and formed with an opening accommodating said stem, and a pneumatic cushion interposed between said plate and base member.

2. The combination with the body portion, springs, and axle of a vehicle, of a plate secured to said springs and formed with a depending stem, a base member secured to the axle and formed with an opening in which said stem is received, and a pneumatic cushion interposed between the base member and the plate and formed with an opening around said stem and with a side opening slot communicating with said opening.

3. The combination with the body portion, springs, and axle of a vehicle, and a plate secured to said springs and provided with a depending stem, a base member secured to the axle and formed with an opening in which said stem is mounted for longitudinal movement, a pneumatic cushion interposed between the base member and the plate and formed with an opening around said stem and anti-friction balls mounted in the opening in the base member around the stem, as and for the purposes set forth.

In testimony whereof I affix my signature in presence of two witnesses.

JOEL B. TAYLOR, Jr. [L. S.]

Witnesses:
 JNO. T. WODEN,
 THOS. HINDLE.